United States Patent
Smith, Jr. et al.

(10) Patent No.: US 9,525,615 B2
(45) Date of Patent: Dec. 20, 2016

(54) SYSTEMS AND METHODS FOR IMPLEMENTING MULTIPLE ISIS ROUTING INSTANCES ON A NETWORK ELEMENT

(75) Inventors: Albert Vinson Smith, Jr., Richardson, TX (US); Man Wing Fong, Plano, TX (US); Snigdho Chandra Bardalai, San Ramon, CA (US)

(73) Assignee: Fujitsu Limited, Kawasaki (JP)

( * ) Notice: Subject to any disclaimer, the term of this patent is extended or adjusted under 35 U.S.C. 154(b) by 607 days.

(21) Appl. No.: 12/832,430

(22) Filed: Jul. 8, 2010

(65) Prior Publication Data

US 2012/0011235 A1    Jan. 12, 2012

(51) Int. Cl.
| | | |
|---|---|---|
| *G06F 15/177* | (2006.01) | |
| *G06F 15/16* | (2006.01) | |
| *H04L 12/715* | (2013.01) | |
| *H04L 12/26* | (2006.01) | |
| *H04L 12/54* | (2013.01) | |

(52) U.S. Cl.
CPC ........... *H04L 45/04* (2013.01); *H04L 12/5695* (2013.01); *H04L 43/065* (2013.01); *H04L 43/12* (2013.01)

(58) Field of Classification Search
USPC ......................................... 709/220–222, 227
See application file for complete search history.

(56) References Cited

U.S. PATENT DOCUMENTS

| | | | | |
|---|---|---|---|---|
| 6,941,487 | B1* | 9/2005 | Balakrishnan ........ | H04W 24/04 370/216 |
| 7,461,154 | B2* | 12/2008 | Figaro et al. ................. | 709/227 |
| 7,715,382 | B2* | 5/2010 | Lakshman et al. ........... | 370/389 |
| 8,385,194 | B2* | 2/2013 | Lange ............................ | 370/230 |
| 2008/0209334 | A1* | 8/2008 | Pirbhai et al. ................ | 715/736 |
| 2008/0225716 | A1* | 9/2008 | Lange ........................... | 370/232 |
| 2008/0263188 | A1* | 10/2008 | Awduche et al. ............. | 709/223 |

* cited by examiner

*Primary Examiner* — Minh-Chau Nguyen
(74) *Attorney, Agent, or Firm* — Baker Botts L.L.P.

(57) ABSTRACT

According to one embodiment, a method may include instantiating a primary intermediate system to intermediate system (ISIS) instance on a network element. The method may further include instantiating a secondary ISIS instance on the network element. The method may also include configuring the primary ISIS instance and the secondary ISIS instance to appear as a single ISIS instance to other network elements remote to the network element.

21 Claims, 3 Drawing Sheets

SYSTEMS AND METHODS FOR IMPLEMENTING MULTIPLE ISIS ROUTING INSTANCES ON A NETWORK ELEMENT

TECHNICAL FIELD

This invention relates generally to the field of communications systems and more specifically to implementing multiple intermediate system to intermediate system routing instances on a network element.

BACKGROUND

A communication network includes network elements that route packets through the network, predominantly in line card hardware. To route packets, network elements often utilize intermediate system to intermediate system (ISIS) protocol. Traditionally, ISIS routers are designated as being Level 1 (intra-area); Level 2 (inter-area); or Level 1-2 (both). Level 2 routers are inter-area routers that can only form relationships with other Level 2 routers. Routing information is exchanged between Level 1 routers and other Level 1 routers, and Level 2 routers only exchange information with other Level 2 routers. Level 1-2 routers exchange information with both levels and are used to connect the inter area routers with the intra area routers. In ISIS, area borders are in between routers, designated as Level 2 or Level 1-2. The result is that an ISIS router is only ever a part of a single area. Thus, ISIS traditionally creates a logical topology of a backbone of Level 2 routers with branches of Level 1-2 and Level 1 routers forming the individual areas.

The hierarchy of Level 1 and Level 2 ISIS routers is often present because the number of network elements in a Level 1 ISIS area is limited due to the time it takes for convergence of routing algorithms for an area (e.g., via a shortest path first algorithm). However, such hierarchy requires management of both the Level 1 and Level 2 routing areas which in effect causes artificial partitioning of a network. Over time, these artificial partitions may lead to undesirable management complexity.

SUMMARY OF THE DISCLOSURE

In accordance with the present invention, disadvantages and problems associated with management complexity of ISIS routing instances may be reduced or eliminated.

According to one embodiment, a method may include instantiating a primary intermediate system to intermediate system (ISIS) instance on a network element. The method may further include instantiating a secondary ISIS instance on the network element. The method may also include configuring the primary ISIS instance and the secondary ISIS instance to appear as a single ISIS instance to other network elements remote to the network element.

Certain embodiments of this disclosure may provide one or more technical advantages. A technical advantage may be that embodiments of this disclosure may provide a global forwarding plane across multiple ISIS routing instances, thus allowing a network administrator to manage a single ISIS area across a large network. Also, because a multiple ISIS instance network element may appear as a single network element to other network elements, a routing solution may be provided that is agnostic to legacy network elements and third party network elements.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1:
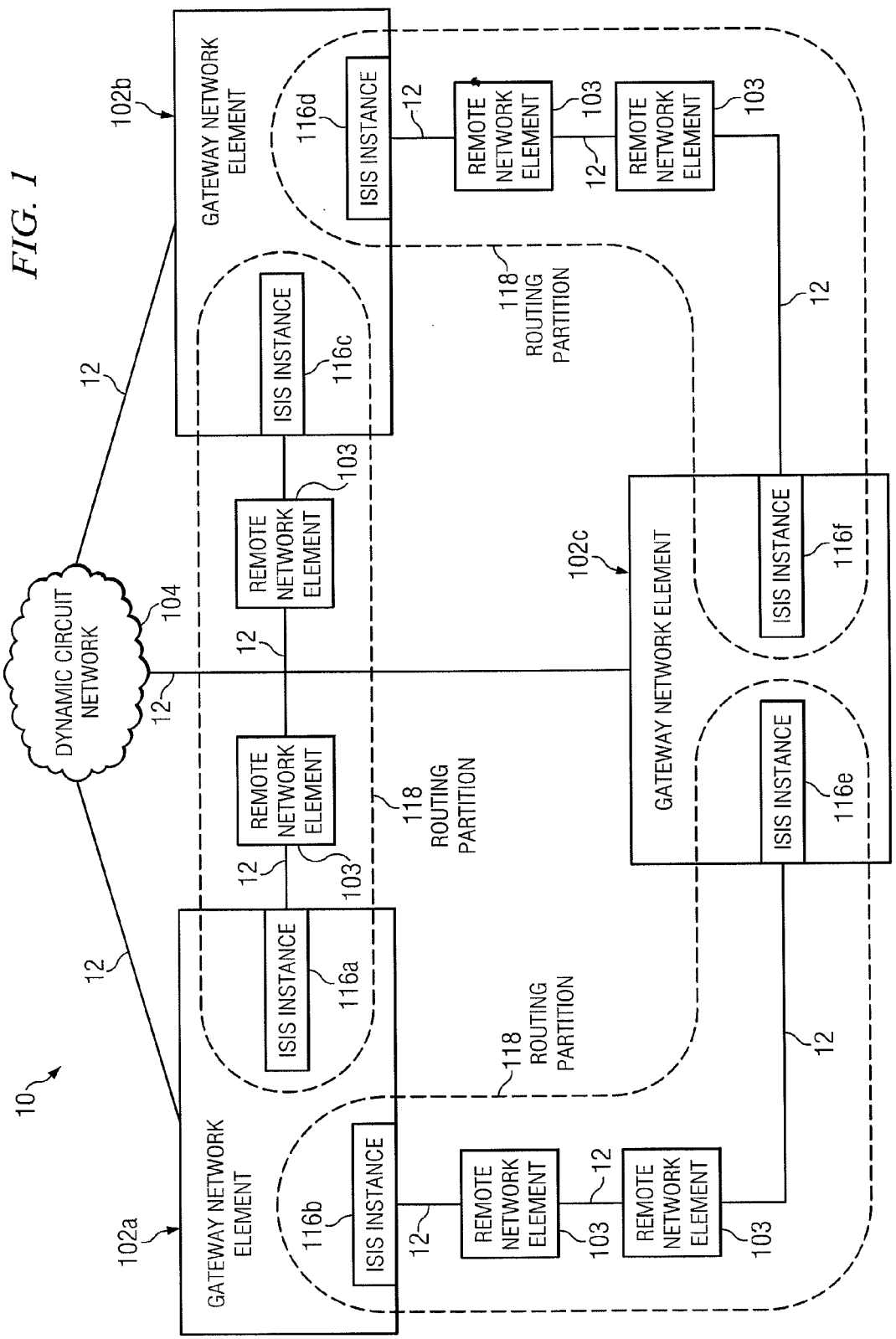
FIG. 1 illustrates a block diagram of an example network, in accordance with certain embodiments of the present disclosure.
Figure 2:
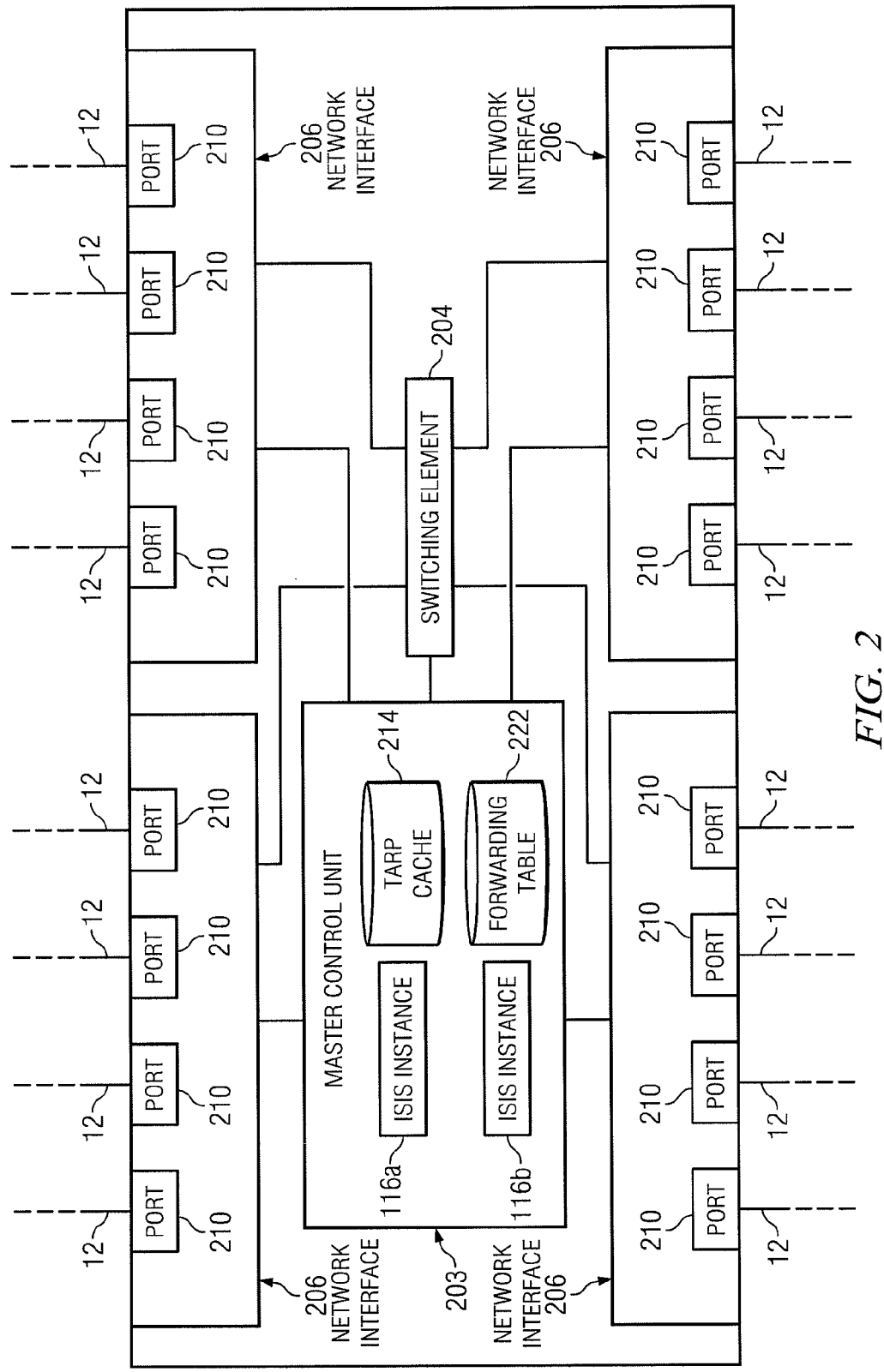
FIG. 2 illustrates a block diagram an example gateway network element, in accordance with certain embodiments of the present disclosure.
Figure 3:
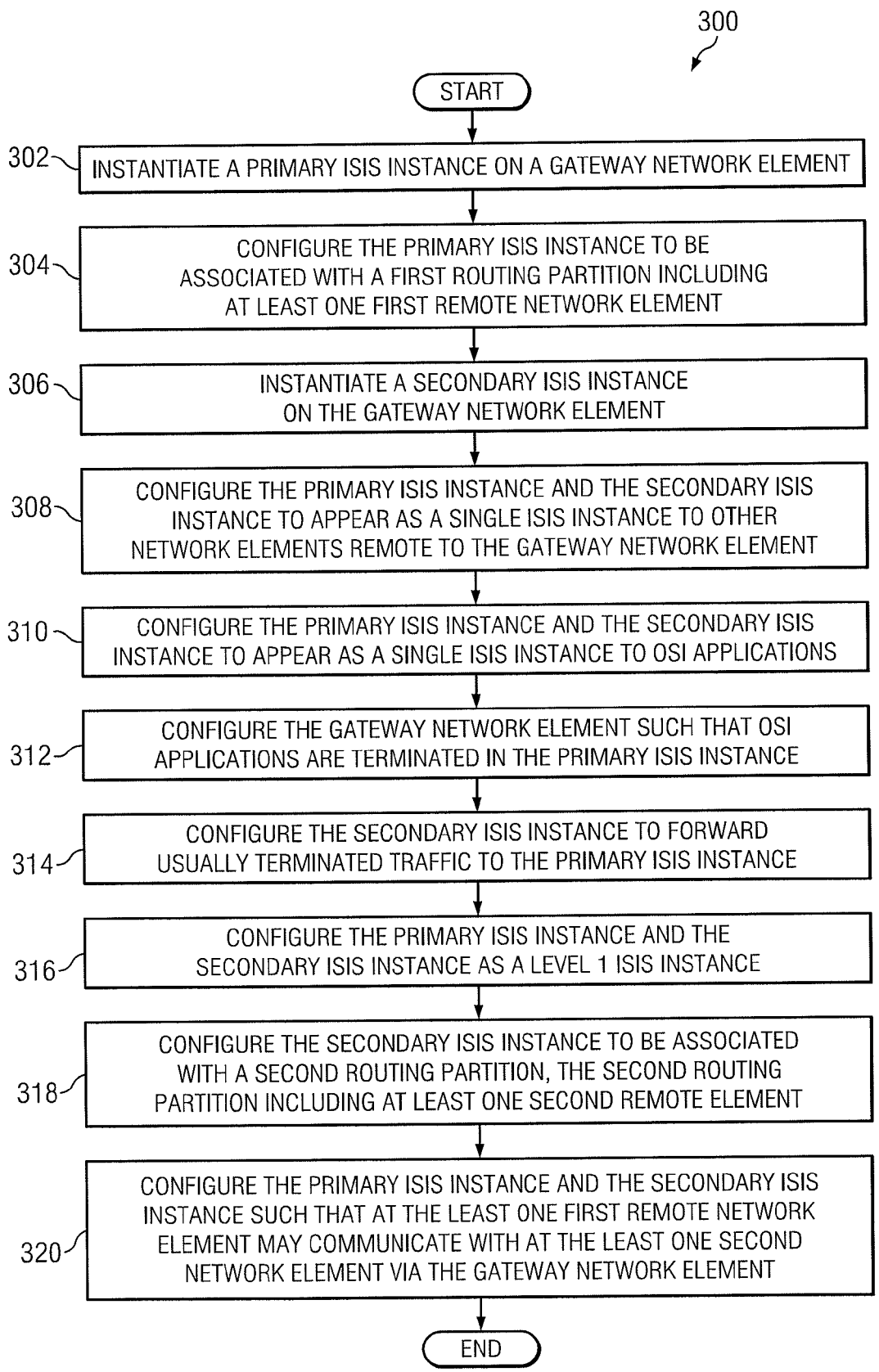
FIG. 3 illustrates a flow chart of an example method for implementing multiple ISIS routing instances on a network element, in accordance with certain embodiments of the present disclosure.

Embodiments of the present invention and its advantages are best understood by referring to FIGS. 1-3, like numerals being used for like and corresponding parts of the various drawings.

FIG. 1 illustrates a block diagram of an example network 10, in accordance with certain embodiments of the present disclosure. In certain embodiments, network 10 may be an optical network. Network 10 may include one or more transmission media 12 operable to transport one or more signals communicated by components of network 10. The components of network 10, coupled together by transmission media 12, may include a plurality of network elements 102 and 103 and a dynamic circuit network 104. The illustrated network 10 includes gateway network elements 102 (e.g., gateway network elements 102a, 102b, and 102c) and remote network elements 103. Although a particular configuration of network elements 102 and 103 is depicted in FIG. 1, any suitable configuration of any suitable number of network elements 102 and 103 may create network 10. Network 10 may also be configured as a mesh network, ring network, a point-to-point network, or any other suitable network or combination of networks. Network 10 may be used in a short-haul metropolitan network, a long-haul inter-city network, or any other suitable network or combination of networks.

Each transmission medium 12 may include any system, device, or apparatus configured to communicatively couple network devices 102 and 103 to each other and communicate information between corresponding network devices 102 and 103. For example, a transmission medium 12 may include an optical fiber, an Ethernet cable, a T1 cable, a WiFi signal, a Bluetooth signal, or other suitable medium.

Network 10 may communicate information or "traffic" over transmission media 12. As used herein, "traffic" means information transmitted, stored, or sorted in network 10. Such traffic may comprise optical or electrical signals configured to encode audio, video, textual, and/or any other suitable data. The data may also be real-time or non-real-time. Traffic may be communicated via any suitable communications protocol, including, without limitation, the Open Systems Interconnection (OSI) standard and ISIS. Additionally, the traffic communicated in network 10 may be structured in any appropriate manner including, but not limited to, being structured in frames, packets, or an unstructured bit stream.

Dynamic circuit network 104 may be a system that combines traditional packet-switching communication based on Internet Protocol with circuit-switching methodologies that are characteristic of traditional telephone network systems. Such combination may allow user-initiated ad-hoc dedicated allocation of network bandwidth for high-demand, real-time applications and network services, delivered over an optical fiber infrastructure.

Each network element 102 and 103 in network 10 may comprise any suitable system operable to transmit and receive traffic. In the illustrated embodiment, each network element 102 and 103 may be operable to transmit traffic directly to one or more other network elements 102/103 and receive traffic directly from the one or more other network elements 102/103. In addition, gateway network elements 102 may be operable to transmit traffic to and receive traffic from dynamic circuit network 104. Thus, each gateway network element 102 may serve as a gateway between dynamic circuit network 104 and remote network elements 103. Gateway network elements 102 will be discussed in more detail below with respect to FIG. 2.

Each network element 102/103 may generally be configured to receive data from and/or transmit data to one or more other network elements 102/103. In certain embodiments, a network element 102/103 may comprise a switch configured to route data received by network element 102/103 to another device (e.g., another network element 102/103) coupled to the network element 102/103.

In addition, gateway network elements 102 may have instantiated thereon one or more ISIS instances 116 (e.g., ISIS instances 116a-116f). Each ISIS instance 116 may include any system, apparatus, or device configured to manage ISIS routing for the gateway network element 102 for which such ISIS instance 116 is instantiated. In certain embodiments, one or more gateway network elements 102 may individually include a plurality of ISIS instances 116. In such embodiments, ISIS instances 116 instantiated on a gateway network element 102 may be logically configured such that the ISIS instances appear as a single ISIS instance to remote network elements 103. Such configuration may include configuring one ISIS instance 116 on a gateway network element 102 as a primary instance, and configure all other ISIS instances 116 on the gateway network element 102 as secondary instances. For example, ISIS instance 116a may be configured as a primary instance, ISIS instance 116b (and any other ISIS instances 116 of gateway network element 102) may be configured as a secondary instance, and gateway network element 102 may appear to remote network elements 103 and/or Open Systems Interconnection (OSI) applications as having only one ISIS instance 116a. To allow support for OSI applications over multiple ISIS instances 116 in a single gateway network element 102, such applications may be terminated in the primary ISIS instance 116 of a gateway network element 102, while all secondary ISIS instances 116 may forward locally terminated traffic to the primary ISIS instance 116 for the gateway network element.

In the same or alternative embodiments, each ISIS instance 116 may be a Level 1 ISIS instance. In these and other embodiments, each ISIS instance 116 may also be of the same area.

As shown in FIG. 1, ISIS instances 116 and remote network elements 103 may be associated with a routing partition 118. Each routing partition 118 may in effect be a routing plane specific to the instances 116 associated with the routing partition 118, such that a remote network element 103 may communicate traffic to another remote network element 103 in a different routing partition 118 via a gateway network element 102.

In operation, a global forwarding plane may exist across all ISIS instances 116, without the necessity to partition ISIS instances 116 into Level 1 and Level 2 instances—all ISIS instances 116 may be Level 1 instances, thus reducing network management complexity by allowing a network administrator to manage a single ISIS area across a large network. As the number of network elements 102 and 103 in an area increases, the network elements 102 and 103 may be segregated to different ISIS instances 116 and/or routing partitions 118 to allow scaling while keep shortest path first convergence time minimal. In addition, because a multiple ISIS instance network element 102 may appear as a single ISIS instance to other network elements in a network, multiple ISIS instance network elements may be compatible with legacy network elements and third party network elements.

FIG. 2 illustrates a block diagram an example gateway network element 102, in accordance with certain embodiments of the present disclosure. The embodiment of FIG. 2 discloses one potential implementation of multiple-instance ISIS and is intended to be illustrative. Other implementations may be possible.

As depicted in FIG. 2, each gateway network element 102 may include a master control unit 203, a switching element 204, and one or more network interfaces 206 communicatively coupled to each of master control unit 203 and switching element 204.

Master control unit 203 may include any suitable system, apparatus, or device configured to manage gateway network element 102, including management of routing of data between ports 210. Master control unit 103 may maintain a forwarding table 222. Forwarding table 222 may also be referred to as a forwarding information base (FIB) and may include any table, database, file, or other data structure configured to maintain information relating a particular ingress port 210 to a corresponding egress port 210 (e.g., to allow the gateway network element 102 to find the proper interface to which the input interface should send a packet to be transmitted by the gateway network element 102). Forwarding table 222 may be updated from time to time based on information received from ISIS instances 116. In some embodiments, forwarding table 222 may be created and maintained in accordance with Connectionless Network Protocol (CLNP).

ISIS instances 116 (e.g., ISIS instances 116a and 116) are depicted as being instantiated on master control unit 103 for the purposes of exposition. However, ISIS instances 116 may be instantiated on any component of gateway network element 102, and in some cases may be distributed among one or more components. Each multiple ISIS instance gateway network element 102 may include a primary ISIS instance 116 and one or more secondary instances 116. For example, ISIS instance 116a may be a primary instance, and ISIS instance 116b may be a secondary instance. For proper operation, each ISIS instance 116 may require a unique identifier. Accordingly, a primary instance may be assigned a local communication network (LCN) Media Access Control (MAC) address while secondary instances may be assigned MAC addresses from a network element management unit (NEM) pool or other similar pool of identifiers.

As shown in FIG. 2, master control unit 203 may include target identifier (TID) address resolution protocol (TARP)

cache 214. TARP cache 214 may be stored in memory and/or other computer readable media, and may include a file, map, list, database, table, or other suitable data structure configured to store entries mapping TIDs for one or more gateway network elements 102 to corresponding NSAP addresses associated with ISIS instances 116. In addition, gateway network element 102 may be configured such that its primary ISIS instance (e.g., ISIS instance 116a) may serve as the gateway network element 102's TARP instance which may support propagation, loop detection, time-to-live (TTL) processing, timeouts, etc., and may interface to a transaction language 1 (TL1) and/or OSI stack. All TARP-specific traffic may terminate on a primary ISIS instance if such traffic is destined for a local TID.

TARP cache 214 may support multiple instance ISIS gateway network elements 102 by maintaining instance-specific information. TL1 TARP retrieval may support such combined TARP cache 114. For TARP requests, TARP may request adjacency information for each instance from GWAY. A TARP request may be sent to each ISIS instance 116 with its source NSAP address set to the NSAP address of the specific instance. Received TARP responses will be communicated to a TARP process. For TARP traffic received by secondary ISIS instances 116 for TARP propagation, such traffic may be communicated to the gateway network element 102's primary instance 116.

Gateway network elements 102 may be configured such that forwarding (e.g., CLNP forwarding) will occur within both primary and secondary ISIS instances 116. Such forwarding may first include a check of NSAP addresses of local ISIS instances 116 of a gateway network element 102 prior to attempting to locally forward traffic. Secondary ISIS instances 116 may allow reachability to primary instance 116 via TID or NSAP address.

Switching element 204 may be communicatively coupled to master control unit 203 and may include any suitable system, apparatus, or device configured to receive traffic via a port 210 and route such traffic to a particular network interface 206 and/or port 210 based on analyzing the contents of the data and/or based on a characteristic of a signal carrying the data (e.g., a wavelength and/or modulation of the signal). For example, in certain embodiments, a switching element 204 may include a switch fabric (SWF).

Each network interface 206 may include any suitable system, apparatus, or device configured to serve as an interface between a network element 102 and a transmission medium 12. Each network interface 206 may enable its associated network element 102 to communicate to other network elements 102 using any suitable transmission protocol and/or standard. Network interface 206 and its various components may be implemented using hardware, software, or any combination thereof. For example, in certain embodiments, one or more network interfaces 206 may include a network interface card. In the same or alternative embodiments, one or more network interfaces 206 may include a line card.

As depicted in FIG. 2, each of network interfaces 206 may include one or more physical ports 210. Each physical port 210 may include any system, device or apparatus configured to serve as a physical interface between a corresponding transmission medium 12 and network interface 206. For example, a physical port 210 may comprise an Ethernet port, an optical port, or any other suitable port.

FIG. 3 illustrates a flow chart of an example method 300 for implementing multiple ISIS routing instances on a network element, in accordance with certain embodiments of the present disclosure. According to one embodiment, method 300 may begin at step 302. As noted above, teachings of the present disclosure may be implemented in a variety of configurations of network 10. As such, the preferred initialization point for method 300 and the order of the steps 302-320 comprising method 300 may depend on the implementation chosen.

At step 302, a primary ISIS instance may be instantiated on a gateway network element. At step 304, the primary ISIS instance may be configured to be associated with a first routing partition, the first routing partition including at least one first remote network element.

At step 306, a secondary ISIS instance may be configured on the gateway network element. At step 308, the primary ISIS instance and the secondary ISIS instance may be configured to appear as a single ISIS instance to other network elements remote to the gateway network element. At step 310, the primary ISIS instance and the secondary ISIS instance may be configured to appear as a single ISIS instance to Open Systems Interconnection (OSI) applications.

At step 312, the gateway network element may be configured such that OSI applications are terminated in the primary ISIS instance. At step 314, the secondary ISIS instance may be configured to forward locally terminated traffic to the primary ISIS instance.

At step 316, each of the primary ISIS instance and the secondary ISIS instance may be configured as a Level 1 ISIS instance.

At step 318, the secondary ISIS instance may be configured to be associated with a second routing partition, the second routing partition including at least one second remote network element. At step 320, the primary ISIS instance and the secondary ISIS instance may be configured such that the at least one first remote network element may communicate with the at least one second network element via the gateway network element.

Although FIG. 3 discloses a particular number of steps to be taken with respect to method 300, method 300 may be executed with greater or lesser steps than those depicted in FIG. 3. In addition, although FIG. 3 discloses a certain order of steps to be taken with respect to method 300, the steps comprising method 300 may be completed in any suitable order.

Method 300 may be implemented using network 10 or any other system operable to implement method 300. In certain embodiments, method 300 may be implemented partially or fully in software and/or firmware embodied in memory.

Modifications, additions, or omissions may be made to network 10 without departing from the scope of the disclosure. The components and elements of network 10 described may be integrated or separated according to particular needs. Moreover, the operations of network 10 may be performed by more, fewer, or other components.

A component of network 10 may include an interface, logic, memory, and/or other suitable element. An interface receives input, sends output, processes the input and/or output, and/or performs other suitable operation. An interface may comprise hardware and/or software.

Logic performs the operations of the component, for example, executes instructions to generate output from input. Logic may include hardware, software, and/or other logic. Logic may be encoded in one or more tangible computer readable storage media and may perform operations when executed by a computer. Certain logic, such as a processor, may manage the operation of a component.

Examples of a processor include one or more computers, one or more microprocessors, one or more applications, and/or other logic.

A memory stores information. A memory may comprise one or more tangible, computer-readable, and/or computer-executable storage medium. Examples of memory include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or other computer-readable medium.

Modifications, additions, or omissions may be made to network 10 without departing from the scope of the invention. The components of network 10 may be integrated or separated. Moreover, the operations of network 10 may be performed by more, fewer, or other components. Additionally, operations of network 10 may be performed using any suitable logic. As used in this document, "each" refers to each member of a set or each member of a subset of a set.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

What is claimed is:

1. A method, comprising:
   instantiating a primary intermediate system to intermediate system (ISIS) instance on a network element, the network element comprising a master control unit, a switching element, and at least one network interface communicatively coupled to the switching element, the network interface comprising one or more physical ports each configured to serve as a physical interface between a transmission medium and the network interface;
   instantiating a secondary ISIS instance on the network element;
   associating the primary ISIS instance with a first routing partition that includes at least one first remote network element;
   associating the secondary ISIS instance with a second routing partition that includes at least one second remote network element, the second routing partition being different from the first routing partition and the second remote network element being different from the first remote network element; and
   configuring the primary ISIS instance and the secondary ISIS instance to appear as a single ISIS instance to other network elements remote to the network element.

2. A method according to claim 1, further comprising configuring the primary ISIS instance and the secondary ISIS instance to appear as a single ISIS instance to Open Systems Interconnection (OSI) applications.

3. A method according to claim 2, further comprising terminating OSI applications in the primary ISIS instance.

4. A method according to claim 3, further comprising configuring the secondary ISIS instance to forward locally terminated traffic to the primary ISIS instance.

5. A method according to claim 1, wherein the network element is a gateway network element.

6. A method according to claim 1, further comprising configuring each of the primary ISIS instance and the secondary ISIS instance as a Level 1 ISIS instance.

7. A method according to claim 1, further comprising:
   configuring the primary ISIS instance and the secondary ISIS instance such that the at least one first remote network element may communicate with the at least one second network element via the network element.

8. A network element, comprising:
   a master control unit;
   a switching element;
   at least one network interface communicatively coupled to the switching element, the network interface comprising one or more physical ports each configured to serve as a physical interface between a transmission medium and the network interface;
   a primary intermediate system to intermediate system (ISIS) instance associated with a first routing partition that includes at least one first remote network element; and
   a secondary ISIS instance associated with a second routing partition that includes at least one second remote network element, the second routing partition being different from the first routing partition and the second remote network element being different from the first remote network element;
   wherein the primary ISIS instance and the secondary ISIS instance to appear as a single ISIS instance to other network elements remote to the network element.

9. A network element according to claim 8, wherein the primary ISIS instance and the secondary ISIS instance are configured to appear as a single ISIS instance to Open Systems Interconnection (OSI) applications.

10. A network element according to claim 9, wherein the primary ISIS instance is further configured such that OSI applications terminate in the primary ISIS instance.

11. A network element according to claim 10, wherein the secondary ISIS instance is further configured to forward locally terminated traffic to the primary ISIS instance.

12. A network element according to claim 8, wherein the network element is a gateway network element.

13. A network element according to claim 8, wherein the first ISIS instance and the second ISIS instance are each further configured as a Level 1 ISIS instance.

14. A network element according to claim 8, wherein:
   the primary ISIS instance and the secondary ISIS instance are further configured such that the at least one first remote network element may communicate with the at least one second network element via the network element.

15. A system, comprising:
   a processor; and
   a non-transitory computer readable storage medium storing instructions that, when executed by the processor, cause the processor to:
   instantiate a primary intermediate system to intermediate system (ISIS) instance on a network element, the network element comprising a master control unit, a switching element, and at least one network interface communicatively coupled to the switching element, the network interface comprising one or more physical ports each configured to serve as a physical interface between a transmission medium and the network interface;
   instantiate a secondary ISIS instance on the network element;
   associate the primary ISIS instance with a first routing partition that includes at least one first remote network element;

associate the secondary ISIS instance with a second routing partition that includes at least one second remote network element, the second routing partition being different from the first routing partition and the second remote network element being different from the first remote network element; and configure the primary ISIS instance and the secondary ISIS instance to appear as a single ISIS instance to other network elements remote to the network element.

16. A system according to claim 15, wherein the storage medium further stores instructions for configuring the primary ISIS instance and the secondary ISIS instance to appear as a single ISIS instance to Open Systems Interconnection (OSI) applications.

17. A system according to claim 16, wherein the storage medium further stores instructions for terminating OSI applications in the primary ISIS instance.

18. A system according to claim 17, wherein the storage medium further stores instructions for configuring the secondary ISIS instance to forward locally terminated traffic to the primary ISIS instance.

19. A system according to claim 15, wherein the network element is a gateway network element.

20. A system according to claim 15, wherein the storage medium further stores instructions for configuring each of the primary ISIS instance and the secondary ISIS instance as a Level 1 ISIS instance.

21. A system according to claim 15, wherein the storage medium further stores instructions for configuring the primary ISIS instance and the secondary ISIS instance such that the at least one first remote network element may communicate with the at least one second network element via the network element.

* * * * *